March 31, 1970  B. F. ROSE, JR  3,503,413
AUXILIARY SEWAGE STORAGE SYSTEM FOR
TEMPORARILY STORING SEWAGE
Filed May 3, 1967
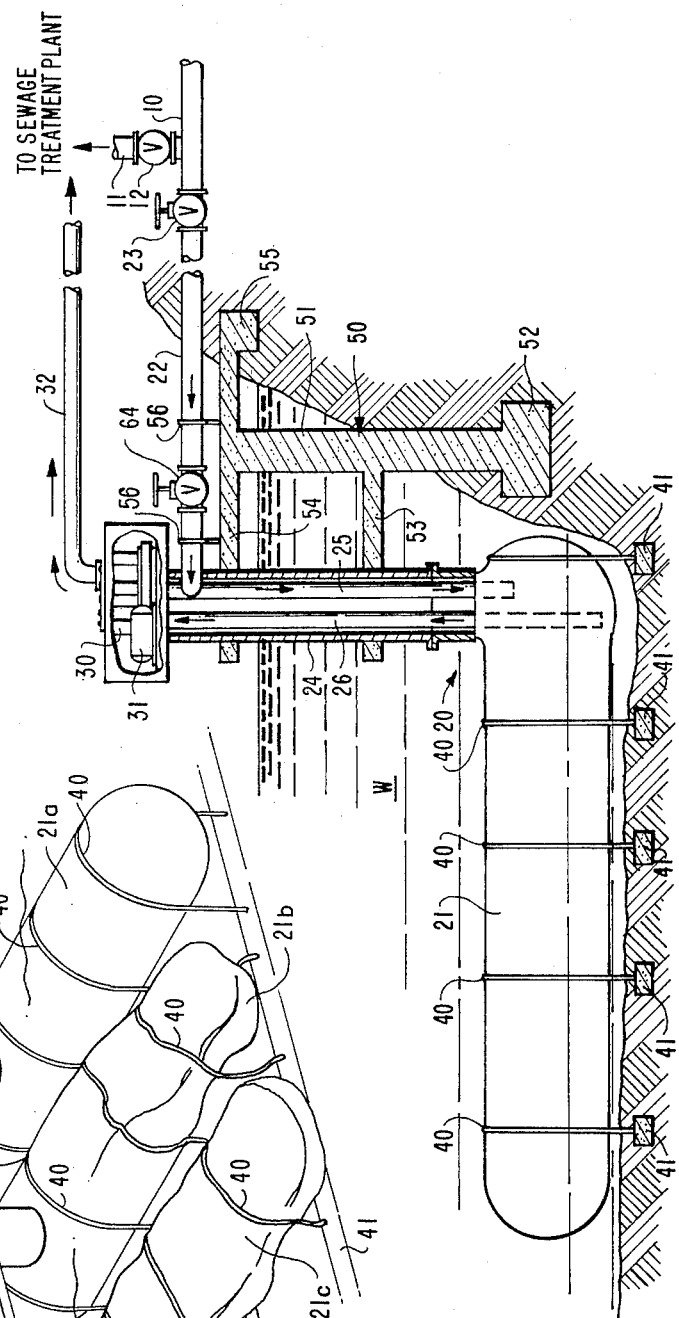
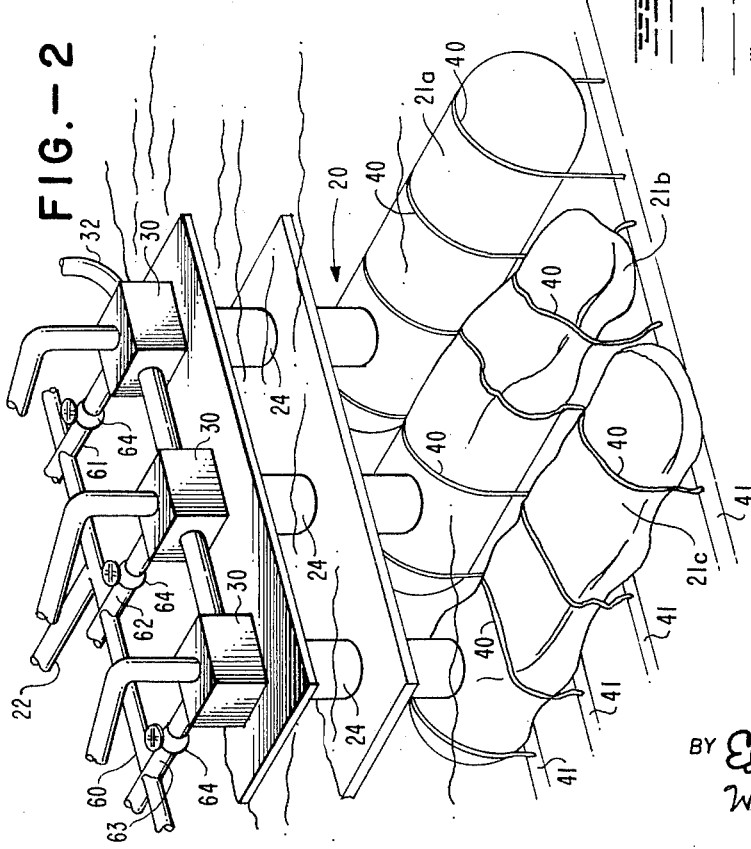
INVENTOR
BENJAMIN F. ROSE, JR.
BY Edward O. Ansell
William E. Hiller
ATTORNEYS

# United States Patent Office 3,503,413
Patented Mar. 31, 1970

3,503,413
AUXILIARY SEWAGE STORAGE SYSTEM FOR TEMPORARILY STORING SEWAGE
Benjamin Franklin Rose, Jr., Covina, Calif., assignor to Aerojet-General Corporation, El Monte, Calif., a corporation of Ohio
Filed May 3, 1967, Ser. No. 635,877
Int. Cl. E03f 5/10, 1/00
U.S. Cl. 137—266                9 Claims

ABSTRACT OF THE DISCLOSURE

This disclosure concerns an auxiliary sewage storage system for temporarily storing raw sewage under peak load conditions for the sewage treatment plant to which it is an adjunct so as to provide for subsequent processing of the raw sewage stored in the auxiliary sewage storage system by the sewage treatment plant when the load conditions thereof return to normal. The auxiliary sewage storage system comprises one or more flexible storage bags connected into a by-pass conduit arrangement having a normally closed valve therein such that raw sewage is ordinarily introduced via a main conduit into the sewage treatment plant for processing. When the sewage treatment plant is operating at capacity under peak load conditions, the inlet conduit thereto from the main conduit is closed and the valve in the by-pass conduit is opened so as to direct additional raw sewage to the flexible storage bags instead of the sewage treatment plant for temporary storage thereof. When the load conditions for the sewage treatment plant have returned to normal, raw sewage contained within the flexible storage bags is piped therefrom to the sewage treatment plant for processing.

Background of the invention

The present invention generally relates to a sewage disposal system for the treatment of raw sewage, and more particularly to an auxiliary sewage storage system for a sewage treatment plant which is capable of temporarily storing raw sewage for subsequent processing by the sewage treatment plant whenever the capacity of the sewage treatment plant to process raw sewage is exceeded under peak load conditions.

In many communities throughout the country, sanitary sewers and storm sewers are combined in a single disposal system, wherein rainfall must be accommodated by the same system of piping employed to dispose of sewage waste. In this type of combined disposal system, an overload on the sewage treatment plant frequently occurs whenever there is a heavy rainfall. Such an overload results in large volumes of raw sewage being by-passed around the sewage treatment plant serving the disposal system, with the raw sewage being discharged into nearby rivers, lakes, or oceans adding to the polution of such bodies of water.

Even where a community may have separate disposal systems for sanitary and storm sewers, wherein the storm sewers dispose of rainfall independently of raw sewage disposal, there may be frequent occasions when the sewage treatment plant processing raw sewage introduced thereinto from the sanitary sewers is unable to handle excessive volumes of raw sewage at peak load conditions.

Summary of the invention

The present invention provides an auxiliary sewage storage system as an adjunct to a sewage treatment and disposal system so as to temporarily store raw sewage under peak conditions of load for the sewage treatment plant to enable the plant to subsequently process such raw sewage, instead of discharging such excess sewage in nearby rivers, lakes, or oceans whenever the capacity of the sewage treatment plant for processing raw sewage is exceeded. To this end, the auxiliary sewage storage system comprises one or more flexible elongated bags serving as temporary storage containers for raw sewage, the bags being adapted to be connected to a by-pass conduit running off from the main sewage line or lines leading into the sewage treatment plant. Whenever the capacity of the sewage treatment plant to process raw sewage is exceeded, such as in instances of heavy rainfall where the sewage treatment plant is included in combined disposal systems including both sanitary and storm sewers, the flow of raw sewage into the treatment plant is shut off and the excess raw sewage is directed through the by-pass conduit where it flows by gravity into one of the flexible bags for temporary storage. Should one of the flexible bags become completely filled with excess raw sewage, an appropriate control system thereafter directs additional sewage to another bag in the series of bags forming the temporalarity containers comprising the auxiliary sewage storage system. Thereafter, when the load conditions for the sewage treatment plant have returned to normal, the raw sewage in the flexible bags comprising the auxiliary sewage storage system is piped to the sewage treatment plant for processing.

Brief description of the drawings

FIGURE 1 is a schematic view of a sewage disposal system incorporating an auxiliary sewage storage system therewith in accordance with the present invention, portions of the auxiliary sewage storage system being shown in elevation and portions being shown in section; and FIGURE 2 is a perspective view of an auxiliary sewage storage system similar to that shown in FIGURE 1, but showing a plurality of auxiliary storage containers wherein one of the auxiliary storage containers is illustrated in extended form as being filled with sewage, while other storage containers are illustrated in collapsed form.

Detailed description

Referring more specifically to the drawings, FIGURE 1 illustrates a sewage disposal system having an auxiliary sewage storage system incorporated therewith in accordance with the present invention. It will be understood that the sewage disposal system may be intended to handle the load from a combined sanitary and storm sewer drain system. However, the disposal system may also be of the type intended to serve for processing sewage from a sanitary sewer system which is independent of the disposal system for storm sewers. To this end, a main conduit 10 is provided as representative of a piping system serving both sanitary and storm sewers, or alternatively sanitary sewers alone. A branch conduit 11 is connected to the main conduit 10 and serves as the inlet conduit for a sewage treatment plant so as to introduce raw sewage from the main conduit 10 into the sewage treatment plant for processing. A valve 12, which may be either manually operable or automatically operable, is interposed in the inlet conduit 11 so as to control the introduction of raw sewage from the main conduit 10 into the sewage treatment plant. Under normal load conditions, the valve 12 is open, and effluent from the main conduit 10 is permitted to flow through the inlet conduit 11 to the sewage treatment plant for processing without interruption.

The sewage treatment plant has a certain designed capacity for handling a peak volume of effluent. When the sanitary and storm sewers are combined in a single disposal system, the runoff from a heavy rainfall into the storm sewers will frequently produce a condition wherein the effluent in the main conduit 10 significantly exceeds the rated capacity of the sewage treatment plant for processing such material. Ordinarily, when this overload condition occurs, the excess effluent is by-passed around the sewage treatment plant and discharged in nearby rivers, lakes, or oceans, thereby increasing the pollution of such bodies of water. Even when the sewage treatment plant is not required to handle effluent from a storm sewer system, such that raw sewage alone flows through the main conduit 10, it is not uncommon for the capacity of the sewage treatment plant to process such raw sewage to be exceeded such that other measures must be taken for disposing of the excess raw sewage which usually involves the discharging of such raw sewage in nearby bodies of water.

The present invention is intended to temporarily store any effluent in the main conduit 10 in excess of the treatment capacity of the sewage treatment plant and, to this end, provides an auxiliary sewage storage system broadly identified by reference numeral 20. As shown in FIGURE 1, the auxiliary sewage storage system 20 comprises at least one storage container for temporarily storing excess effluent from the main conduit 10, the storage container preferably taking the form of an elongated flexible bag 21. In the form of the invention shown in FIGURE 2, three such storage containers or flexible bags 21a, 21b, and 21c are illustrated for purposes of example. As will be described hereinafter, the bags 21a, 21b, and 21c are adapted to successively receive excess effluent from the main conduit 10, the effluent being directed into a first bag 21a until the bag is filled, and being thereafter directed into a second bag 21b, with bag 21c being available for filling as the preceding bag 21b in the series becomes filled with effluent. In this respect, it will be understood that the present auxiliary sewage storage system 20 contemplates one or more of such storage containers 21, depending upon the expected storage requirements needed to accommodate excess effluent in the main conduit 10 above the treatment capacity of the sewage treatment plant.

A by-pass conduit 22 is connected to the main conduit 10, the by-pass conduit 22 being adapted to communicate with the interior of the flexible bag 21 in a manner to be presently described. The flow of effluent from the main conduit 10 into the by-pass conduit 22 is controlled by a valve 23 which is interposed between the main conduit 10 and the by-pass conduit 22. The valve 23 may be manually or automatically operable and is ordinarily closed when normal load conditions for the sewage treatment plant are present, such that effluent from the main conduit 10 flows through the open valve 12 and the inlet conduit 11 into the sewage treatment plant, but is prevented from flowing through the by-pass conduit 22 by the closed by-pass valve 23. It will be understood that the by-pass conduit 22 may be directly connected to the flexible bag 21 such that effluent from the main conduit 10 may flow therethrough when the by-pass valve 23 is open into the bag 21. Preferably, however, as shown the by-pass conduit 22 is connected into the top portion of a vertically disposed effluent transmission pipe 24 whose lower portion is connected to the flexible storage bag 21 at one end thereof. Thus, the storage bag 21 is disposed at a level significantly below the level of the by-pass conduit 22 such that effluent is permitted to flow by gravity from the by-pass conduit 22 into the storage bag 21 through a vertical inlet pipe 25 received within the effluent transmission pipe 24. The effluent transmission pipe 24 also contains an outlet pipe 26 for the storage bag 21 therewithin, the lower end of the outlet pipe 26 extending within the bag 21 and being disposed adjacent to the bottom surface thereof.

The outlet pipe 26 for the bag 21 is connected into a suitable penstock 30 equipped with a pump 31, the penstock 30 and the pump 31 being located at the upper portion of the vertical effluent transmission pipe 24 and being adapted to pump raw sewage from the bag 21 upwardly through the outlet pipe 26 for subsequent introduction into the sewage treatment plant via a return line conduit 32 which is connected at one end to the discharge side of the penstock 30.

Before receiving any effluent, the storage bag 21 is normally in a collapsed state, such as is shown by two of the three storage bags illustrated in FIGURE 2. Suitable means are provided to retain the storage bag 21 in place and connected to the vertical effluent transmission pipe 24. To this end, a series of spaced straps 40 are provided, each of the straps 40 girdling the flexible bag 21 and having its opposite ends anchored in place beneath the bag, such as by being disposed in concrete beams 41 embedded in the earthen floor beneath the bag 21 and extending transversely thereof. As the flexible bag 21 expands upon reception of effluent material therein, the bag 21 is retained in place by the encircling straps 40, with the arrangement of the straps 40 being such that the flexible bag 21 is permitted to expand without hindrance to its flully expanded position when completely filled with effluent material.

Supporting means are also provided to support the auxiliary sewage storage system 20 in connected relation to the by-pass conduit 22. Prefreably, the flexible bag 21 is located in a body of water W, being tethered by the straps 40 to the earthen floor therefor in which the concrete beams 41 are embedded and being positioned adjacent to a shoreline presenting an earthen and/or rocky ledge rising generally vertically from the floor for the body of water W. In this preferred arrangement, such supporting means is shown as taking the form of a concrete supporting structure 50 having a vertical standard extending upwardly from an enlarged base 52, with vertically spaced arms 53, 54 extending laterally from the vertical standard 51 and having suitable apertures therethrough for receiving the effluent transmission pipe 24 of the auxiliary storage system 20. The enlarged base 52 of the concrete supporting structure 50 is embedded within the earthen and/or rocky ledge defining the shoreline so as to provide firm support to the effluent transmission pipe 24, and the storage container 21 and the penstock 30 and pump 31 disposed at the opposite ends thereof. In this respect, the uppermost arm 54 may include a rearward portion extending backwardly beyond the vertical standard 51 and terminating in an enlarged flanged end 55 embedded in the earthen ledge bounding the body of water W in which the storage bag 21 is preferably disposed. The concrete supporting structure 50 may also provide support for the by-pass conduit 22 which extends above the upper lateral arm 54 thereof. To this end, suitable clamping brackets 56 may be embedded in the upper surface of the arm 54, the brackets 56 being of the type including an arcuate upper portion overlying the by-pass conduit 22 and providing support therefor.

It will be understood that the auxiliary storage system 20 is employed on a stand-by basis such that the by-pass valve 23 connecting the auxiliary sewage storage system 20 into the main conduit 10 for effluent flow is closed at all times when the sewage treatment plant is capable of handling the effluent flowing through the main conduit 10. Under peak load conditions when the capacity of the sewage treatment plant is exceeded, the valve 12 controlling the flow of effluent from the main conduit 10 through the inlet conduit 11 is closed and the by-pass valve 23 is opened, thereby re-directing effluent flow from the main conduit 10 to the by-pass conduit 22 from where it subsequently flows by gravity into the collapsed storage bag 21 of the auxiliary sewage storage system 20. In this way, excess effluent from the main conduit 10 is temporarily stored in the flexible bag 21 which expands as it is filled. When the peak load condition for the sewage treatment plant subsides and the capacity of the sewage treatment plant enables it to handle the effluent in the main conduit 10 plus additional effluent, the pump 31 is placed in operation to pump the effluent material in the storage bag 21 upwardly through the outlet pipe 26 and the penstock 30 into the return line 32 from where such effluent is introduced into the sewage treatment plant for processing.

Referring to FIGURE 2, it will be seen that plural storage bags 21a, 21b, and 21c are included in the auxiliary sewage storage system 20 therein disclosed, the principle of operation being the same as that described in connection with FIGURE 1. In FIGURE 2, the by-pass conduit 22 includes a manifold portion 60 enabling the by-pass conduit 22 to serve all of the storage bags 21a, 21b, and 21c in turn. Thus, the by-pass manifold portion 60 includes branch by-pass conduits 61, 62, and 63 respectively, which correspond to the storage bags 21a, 21b, and 21c. Excess effluent material from the main conduit 10 is discharged into only one of the storage bags 21a, 21b, and 21c at a time. Thus, the branch by-pass conduits 61, 62, and 63 are respectively provided with valves 64 therein which may be either of the manually operable or automatically operable type. At any one time, only one of the valves 64 is opened, the other valves 64 being closed such that effluent material flowing in the by-pass conduit 22 is directed to a single storage bag. Each of the storage bags 21a, 21b, and 21c is provided with a respective effluent transmission pipe 24 which is connected at its lower end to the respective bag. A penstock 30 equipped with a pump is disposed at the upper end of each effluent transmission pipe 24. Thus, it will be understood that when the first flexible bag 21a is completely filled with effluent material, the valve 64 in the branch by-pass conduit 61 therefor is closed, and the valve 64 in the branch by-pass conduit 62 for the storage bag 21b adjacent thereto is opened to permit subsequent effluent material to be directed into the empty storage bag 21b. In like manner, each of the storage bags 21a, 21b, and 21c may be individually filled with effluent material, thereby increasing the capacity of the auxiliary sewage storage system 20 to temporarily store effluent material in excess of the capacity of the sewage treatment plant at peak load conditions. Each of the storage bags 21a, 21b, and 21c may be emptied of its contents in the same manner described in connection with FIGURE 1 so as to return effluent material via return line conduit 32 to the sewage treatment plant for processing when the peak load condition for the plant has subsided. Alternatively, where the disposal system is located near a coastline, the storage bags included in the auxiliary sewage storage system when filled with effluent material could be towed to open sea where the effluent material is discharged therefrom, rather than return such effluent material to the sewage treatment plant for processing after its peak load condition has subsided.

Thus, it will be seen that I have disclosed an auxiliary sewage storage system for temporarily storing sewage under peak load conditions for a sewage treatment plant, thereby increasing the capacity of a sewage treatment plant for processing raw sewage by providing for stand-by facilities to accommodate excess effluent material which would otherwise be directly discharged into nearby rivers, lakes, or oceans adding to the pollution of such bodies of water. The auxiliary sewage storage system enables a sewage treatment plant to greatly increase its capacity to handle volumes of effluent material at a relatively modest expense. Since the effluent material temporarily stored by the auxiliary sewage storage system can be processed by the treatment plant at a subsequent period when the peak load condition for the plant has subsided, more efficient use of the equipment included in the sewage treatment plant is assured. In this respect, during sub-normal load conditions for the sewage treatment plant, equipment thereof which might ordinarily be idle during such periods, can be employed in the processing of effluent material stored in the bags of the auxiliary sewage storage system during an earlier period when the sewage treatment plant was unable to handle such material.

I claim:

1. An auxiliary sewage storage system to temporarily store sewage under peak conditions for subsequent processing by a sewage treatment and disposal system, said auxiliary sewage storage system comprising:
   at least one storage container,
   conduit means communicating with said storage container and with the sewage treatment and disopsal system,
   a valve in said conduit means ordinarily shutting off flow of sewage therethrough to said storage container so as to direct sewage flow to the sewage treatment and disposal system,
   whereby said valve can be opened in event of an overload of sewage introduced into the sewage treatment and disposal system so as to by-pass subsequent sewage flow to said storage container,
   a return line extending between said storage container and the sewage treatment and disposal system, and
   means to direct sewage in said storage container to said sewage treatment and disposal system through said return line.

2. An auxiliary sewage storage system to temporarily store sewage under peak conditions for subsequent processing by a sewage treatment and disposal system, said auxiliary sewage storage system comprising:
   at least one storage container, said storage container comprising an elongated flexible bag normally in a collapsed state prior to the introduction of any sewage therein, and
   said flexible bag being expandable from its collapsed state to accommodate sewage admitted therein,
   conduit means communicating with said storage container and with the sewage treatment and disposal system,
   a valve in said conduit means ordinarily shutting off flow of sewage therethrough to said storage container so as to direct sewage flow to the sewage treatment and disposal system,
   whereby said valve can be opened in event of an overload of sewage introduced into the sewage treatment and disposal system so as to by-pass subsequent sewage flow to said storage container,
   a return line extending between said storage container and the sewage treatment and disposal system, and
   means to direct sewage in said storage container to said sewage treatment and disposal system through said return line.

3. An auxiliary sewage storage system as set forth in claim 2, wherein
   a plurality of storage containers are provided,
   said conduit means including branch by-pass conduits respectively corresponding to each of said storage containers and connected thereto, and
   respective valves in each of said branch by-pass conduits for individually controlling the flow of sewage from said conduit means to the respective storage containers,
   whereby said valves in said branch by-pass conduits may be operated so as to fill said plurality of storage containers with sewage one at a time in succession.

4. An auxiliary sewage storage system as set forth in claim 1, wherein
   said storage container comprises an elongated flexible bag normally in a collapsed state prior to the introduction of any sewage thereinto, and
   said flexible bag being expandable from its collapsed state to accommodate sewage admitted thereinto.

5. An auxiliary sewage storage system as set forth in claim 2, further including
   means to retain said flexible bag in place, said retaining means comprising a plurality of spaced apart straps girdling said bag, and each of said straps having its opposite ends fixedly anchored in place at points beneath said bag;

whereby said straps serve to restrain movement of said bag without obstructing expansion of said bag as sewage is received therein.

6. An auxiliary sewage storage system as set forth in claim 2, wherein said storage container is disposed below said conduit means, a vertically extending inlet pipe connecting said storage container to said conduit means and providing communication therebetween such that sewage flows by gravity from said conduit means to said storage container when said valve is open, a vertically extending outlet pipe having its lower end disposed within said storage container adjacent to the bottom surface thereof, said means to direct sewage from said storage container to said sewage treatment and disposal system comurised a penstock having a pump disposed at the upper end of said outlet pipe and operably connected thereto, and said return line being connected to the discharge side of said penstock.

7. An auxiliary sewage storage system as set forth in claim 5, further including a vertically disposed effluent transmission pipe connected at its lower end to said storage container and at its upper end to said penstock, said vertically extending inlet and outlet pipes being disposed within said effluent transmission pipe, and said conduit means extending into said effluent transmission pipe and being connected at one end to said vertically extending inlet pipe.

8. An auxiliary sewage storage system as set forth in claim 7, further including means to support said vertically disposed effluent transmission pipe in relation to said conduit means extending thereinto and to said storage container connected thereto, said supporting means comprising a vertical standard disposed in spaced, substantially parallel relation to said effluent transmission pipe and adapted to have its lower end portion embedded in a geological formation, at least one arm on said vertical standard and extending laterally therefrom in the direction of said effluent transmission pipe, and said lateral arm being provided with an aperture therethrough in the end thereof remote from said vertical standard; and said effluent transmission pipe extending through the aperture in said lateral arm.

9. In a sewage disposal system having a sewage treatment plant, inlet conduit means communicating with the sewage treatment plant through which raw sewage to be treated is introduced into the sewage treatment plant for processing, and valve means in said inlet conduit means for controlling the introduction of raw sewage into the sewage treatment plant, the improvement comprising an auxiliary sewage storage system to temporarily store raw sewage under peak load conditions for the sewage treatment plant so as to provide for subsequent processing of the raw sewage stored in the auxiliary sewage storage system by the sewage treatment plant under normal operating load conditions therefor, said auxiliary sewage storage system comprising:

at least one storage container, a by-pass conduit connected into said inlet conduit means and communicating with said storage container, a normally closed valve in said by-pass conduit preventing flow of raw sewage through said by-pass conduit to said storage container, said valve means in said inlet conduit means being closed and said valve in said by-pass conduit being opened when said sewage treatment plant is operating at capacity in processing raw sewage so that raw sewage is thereafter directed to said storage container through said by-pass conduit, a return conduit extending between said storage container and said sewage treatment plant, and means to direct raw sewage in said storage container to said sewage treatment plant through said return conduit, whereby such raw sewage may be processed by said sewage treatment plant when a peak load condition for the sewage treatment has subsided and the sewage treatment plant is operating under normal or sub-normal load conditions.

References Cited

UNITED STATES PATENTS

| | | | |
|---|---|---|---|
| 1,963,519 | 6/1934 | Astile | 137—256 |
| 2,111,839 | 3/1938 | Chenicek | 137—259 XR |
| 2,244,106 | 6/1941 | Granberg et al. | 137—567 |
| 2,434,027 | 1/1948 | Whittington | 137—565 XR |
| 2,810,265 | 10/1957 | Beckwith | 137—259 XR |
| 2,966,922 | 1/1961 | Wallis | 137—565 XR |
| 3,000,053 | 9/1961 | Hart | 137—567 XR |
| 1,560,044 | 11/1925 | Derrick | 137—565 XR |
| 2,354,915 | 8/1944 | Granberg | 137—565 XR |

M. CARY NELSON, Primary Examiner

R. J. MILLER, Assistant Examiner